United States Patent
Tyhurst et al.

(10) Patent No.: US 9,195,473 B2
(45) Date of Patent: Nov. 24, 2015

(54) METHOD FOR SHARING AN INTERNAL STORAGE OF A PORTABLE ELECTRONIC DEVICE ON A HOST ELECTRONIC DEVICE AND AN ELECTRONIC DEVICE CONFIGURED FOR SAME

(75) Inventors: Timothy Richard Tyhurst, Kichener (CA); Edward Snow Willis, Ottawa (CA); George Dos Santos, Toronto (CA); Michel Theodor Schmiderer, Waterloo (CA); Brandon Dean Slack, Toronto (CA)

(73) Assignee: BlackBerry Limited, Waterloo (CA)

( * ) Notice: Subject to any disclaimer, the term of this patent is extended or adjusted under 35 U.S.C. 154(b) by 122 days.

(21) Appl. No.: 13/439,901

(22) Filed: Apr. 5, 2012

(65) Prior Publication Data
US 2013/0268929 A1    Oct. 10, 2013

(51) Int. Cl.
| | |
|---|---|
| *G06F 15/16* | (2006.01) |
| *G06F 15/167* | (2006.01) |
| *G06F 15/177* | (2006.01) |
| *G06F 9/44* | (2006.01) |

(52) U.S. Cl.
CPC .................................. *G06F 9/4411* (2013.01)

(58) Field of Classification Search
CPC . H04L 65/1069; H04L 41/08; H04L 67/1097; H04L 67/42; G06F 15/177; G06F 17/30893; G06F 3/067; G06F 9/4416
USPC ......... 709/212, 208, 211, 213–216, 217, 219, 709/220, 222, 227–229
See application file for complete search history.

(56) References Cited

U.S. PATENT DOCUMENTS

| | | | | |
|---|---|---|---|---|
| 6,567,919 | B1 * | 5/2003 | Yanagihara et al. | 726/7 |
| 6,976,134 | B1 * | 12/2005 | Lolayekar et al. | 711/148 |
| 7,552,191 | B1 * | 6/2009 | Goldman et al. | 709/217 |
| 8,078,688 | B2 * | 12/2011 | Ansari et al. | 709/217 |
| 8,095,623 | B2 * | 1/2012 | Panabaker et al. | 709/219 |
| 2002/0083131 | A1 * | 6/2002 | Machida | 709/203 |
| 2003/0149763 | A1 * | 8/2003 | Heitman et al. | 709/224 |
| 2003/0212765 | A1 * | 11/2003 | Takeuchi et al. | 709/219 |
| 2004/0122909 | A1 * | 6/2004 | Saika | 709/213 |
| 2005/0060385 | A1 * | 3/2005 | Gupta et al. | 709/219 |
| 2005/0204049 | A1 * | 9/2005 | Ueoka et al. | 709/229 |
| 2008/0059556 | A1 * | 3/2008 | Greenspan et al. | 709/201 |
| 2010/0235461 | A1 * | 9/2010 | Haba | 709/213 |
| 2012/0151022 | A1 * | 6/2012 | Ayyagari et al. | 709/222 |

FOREIGN PATENT DOCUMENTS

| | | |
|---|---|---|
| WO | 03/012577 A2 | 2/2003 |
| WO | WO 03/012577 A2 * | 2/2003 |

OTHER PUBLICATIONS

ITechTalk, from http://www.itechtalk.com/thread3682.html, dated Apr. 8, 2009.*

(Continued)

*Primary Examiner* — Edward Kim
(74) *Attorney, Agent, or Firm* — Ridout & Maybee LLP

(57) ABSTRACT

The present disclosure provides a method for sharing an internal storage of a portable electronic device on a host electronic device and an electronic device configured for same. The internal storage is automatically mounted and dismounted as a network drive on the host electronic device in response to connection events and disconnection events.

17 Claims, 5 Drawing Sheets

(56) References Cited

OTHER PUBLICATIONS

Balden et al., "USB RNDIS/CDC White Paper", Internet citation, Jan. 15, 2003, XP002389884, http://www.belcarra.com/rndis/blcarra_usb_rndis.htm (retrieved on Jul. 12, 2006).
"Universal Serial Bus Communications Class Subclass Specification for Ethernet Control Model Devices", Feb. 9, 2007, XP55037037, http://www.usb.org/developers/devclass_docs/ CDC1.2_WMC1.1_012011.zip (retrieved on Sep. 3, 2012).
European Patent Office, "Extended European Search Report" for European Patent Application No. 12163294.7 dated Sep. 13, 2012.
Office Action dated May 5, 2014 for the corresponding Canadian Patent Application No. 2,773,484.
Office Action dated Jun. 27, 2014 for the corresponding European Patent Application No. 12163294.
Mehdi, Ghayour—Canadian Intellectual Property Office, "Examiner's Requisition" for corresponding Canadian Patent Application No. 2,773,484 dated May 21, 2015, Canada.

* cited by examiner

METHOD FOR SHARING AN INTERNAL STORAGE OF A PORTABLE ELECTRONIC DEVICE ON A HOST ELECTRONIC DEVICE AND AN ELECTRONIC DEVICE CONFIGURED FOR SAME

TECHNICAL FIELD

The present disclosure relates to storage devices, and more particularly to a method for sharing an internal storage of a portable electronic device on a host electronic device and an electronic device configured for same.

BACKGROUND

Portable electronic devices often include internal storage (also known as embedded storage) which may be used to store user data. It is sometimes desirable to access the user data on the internal storage of the portable electronic device when the portable electronic device is connected to a host electronic device over a communication path, such as a universal serial bus (USB), Wi-Fi or Bluetooth connection.

DETAILED DESCRIPTION OF EXAMPLE EMBODIMENTS

Figure 1:
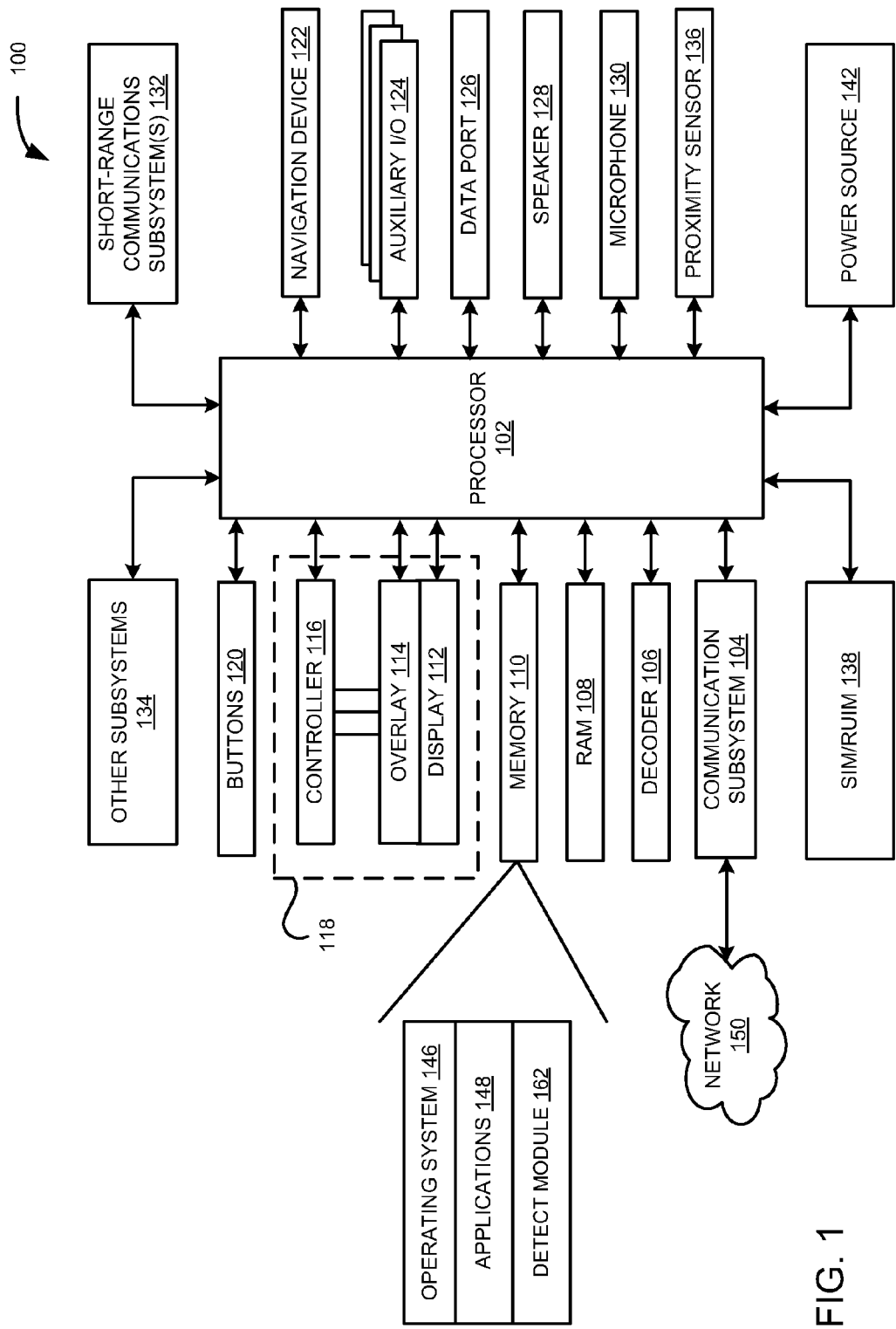
FIG. 1 is a block diagram of components of a portable electronic device in accordance with one example embodiment of the present disclosure.

Reference will now be made to the accompanying drawings which show example embodiments of the present disclosure. For simplicity and clarity of illustration, reference numerals may be repeated among the Figures to indicate corresponding or analogous elements. Numerous details are set forth to provide an understanding of the example embodiments described herein. The example embodiments may be practised without some of these details. In other instances, well-known methods, procedures, and components have not been described in detail to avoid obscuring the example embodiments described. The description is not to be considered as limited to the scope of the example embodiments described herein.

The present disclosure generally relates to portable electronic devices such as handheld electronic devices, and host electronic devices such as desktop computers, laptop computers and workstations. The portable electronic devices may or may not have wireless communication capabilities. The present disclosure provides a method for accessing and sharing an internal storage of a portable electronic device from a host electronic device to which the portable electronic device is connected.

In accordance with one example embodiment, there is provided a method for sharing an internal storage of a portable electronic device, comprising: mounting, without user intervention, the internal storage of the portable electronic device as a network drive on the host electronic device in response to establishment of a communication path between the portable electronic device and the host electronic device. The communication path is a USB (Universal Serial Bus) connection, a Wi-Fi connection or a Bluetooth connection.

In accordance with another example embodiment, there is provided an electronic device, comprising: a processor; at least one communication interface coupled to the processor; wherein the processor is configured for performing the method(s) set forth herein. The at least one communication interface is a Universal Serial Bus (USB) port or a short-range wireless communication interface (such as a Wi-Fi connection or a Bluetooth wireless communication interface).

In accordance with a further embodiment, there is provided a computer program product comprising a computer readable medium having stored thereon computer program instructions for implementing a method on a portable electronic device and host electronic device, the computer executable instructions comprising instructions for performing the method(s) set forth herein.

Reference is first made to FIG. 1 which illustrates a portable electronic device 100 in which example embodiments described in the present disclosure can be applied. The portable electronic device 100 described below has wireless communication capabilities; however, it is contemplated that the teachings of the present disclosure may be applied to devices without wireless communication capabilities. Examples of the portable electronic device 100 include, but are not limited to, a mobile phone, smartphone or superphone, tablet computer, notebook computer (also known as a laptop, netbook or ultrabook computer depending on the device capabilities), wireless organizer, personal digital assistant (PDA), electronic gaming device, and digital camera.

The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150.

The wireless network 150 may comprise one or more of a Wireless Wide Area Network (WWAN) and a Wireless Local Area Network (WLAN) or other suitable network arrangements. In some embodiments, the portable electronic device 100 is configured to communicate over both the WWAN and WLAN, and to roam between these networks. In some embodiments, the wireless network 150 may comprise multiple WWANs and WLANs.

The WWAN may be implemented as any suitable wireless access network technology. By way of example, but not limitation, the WWAN may be implemented as a wireless network that includes a number of transceiver base stations (not shown) where each of the base stations provides wireless Radio Frequency (RF) coverage to a corresponding area or cell. The WWAN is typically operated by a mobile network service provider that provides subscription packages to users of the wireless communication devices such as the portable electronic device 100. In some embodiments, the WWAN conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), Ev-DO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX), IEEE 802.16m (also referred to as Wireless Metropolitan Area Networks or "WMAN"), 3GPP Long Term Evolution (LTE), LTE Advanced, IEEE 802.20 (also referred to as Mobile Broadband Wireless Access or "MBWA") or various other suitable network types. Although WWAN is described as a "Wide-Area" network, that term is intended herein to incorporate other similar technologies for providing coordinated service wirelessly over an area larger than that covered by typical WLANs.

The WLAN comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN in other embodiments such as, for example, IEEE 802.11n, IEEE 802.16e, IEEE 802.16m or IEEE 802.20. The WLAN includes one or more wireless RF Access Points (AP) (not shown) that collectively provide a WLAN coverage area. The WLAN may be a personal network of the user, an enterprise network, or a hotspot offered by an Internet service provider (ISP), a mobile network service provider, or a property owner in a public or semi-public area, for example.

The processor 102 interacts with other components, such as Random Access Memory (RAM) 108, persistent (non-volatile) memory 110 which may be flash erasable programmable read only memory (EPROM) memory ("flash memory") or any other suitable form of memory, a display 112 (such as a liquid crystal display (LCD)) with a touch-sensitive overlay 114 operably coupled to an electronic controller 116 that together comprise a touch-sensitive display 118, one or more keys or buttons 120, a navigation device 122, one or more auxiliary input/output (I/O) subsystems 124, one or more data ports 126 including at least one Universal Serial Bus (USB) port, a speaker 128, a microphone 130, a short-range wireless communication subsystem(s) 132, other device subsystems 134 and a proximity sensor 136. A power source 142, such as one or more rechargeable batteries or a port to an external power supply, powers the portable electronic device 100. The components of the portable electronic device 100 are coupled via a communications bus (not shown) which provides a communication path between the various components.

User-interaction with a graphical user interface (GUI) rendered and displayed on the touch-sensitive display 118 via the processor 102 is performed using input devices including the touch-sensitive display 118. The GUI displays user interface screens on the display 112 which display information such as text, characters, symbols, images, icons, and other items. The one or more data ports 126 may include data ports of different types or may each be of the same type. The auxiliary I/O subsystems 124 may include other input devices such as a keyboard or keypad.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The short-range wireless communication subsystem(s) 132 provides a short-range wireless communication interface. The short-range wireless communication interface may be a personal area network (PAN) interface. A PAN is a wireless point-to-point connection meaning no physical cables are required to connect the two end points. The short-range wireless communication subsystem(s) 132 may include one or more subsystems of the same or different type. The short-range wireless communication subsystems 132 may include, but are not limited to, Bluetooth®, an infrared (IR) subsystem such as Infrared Data Association (IrDA), an IEEE 802.15.3a subsystem (also referred to as UltraWideband (UWB)), Z-Wave subsystem, ZigBee subsystem or other suitable short-range wireless communication interface.

Figure 2:
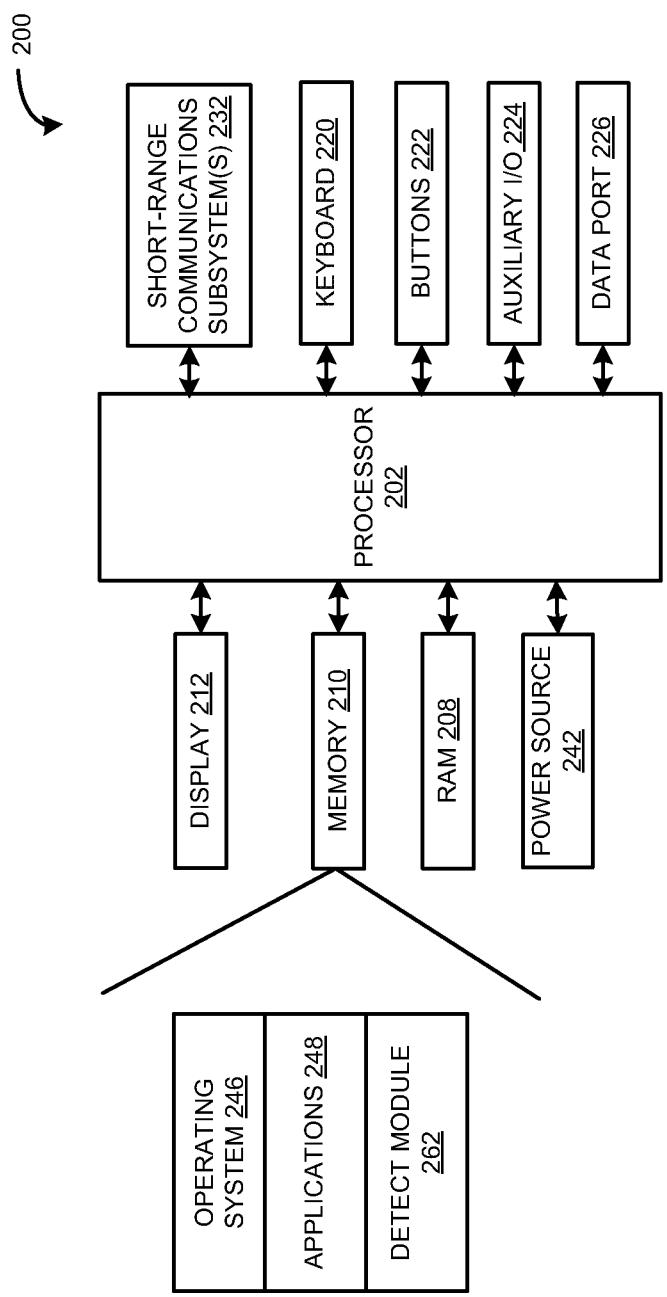
FIG. 2 is a block diagram of components of a host electronic device in accordance with one example embodiment of the present disclosure.

The portable electronic device 100 includes an operating system 146 and software applications 148 that are executed by the processor 102 and are typically stored in a persistent, updatable storage such as the memory 110. Additional applications 148 may be loaded onto the portable electronic device 100 through the wireless network 150, the auxiliary I/O subsystem 124, the data port 126, the short-range wireless communication subsystem(s) 132, or any other suitable subsystem 134. The applications 148 include a detect module 162 for detecting connect and disconnect events in which the portable electronic device 100 is connected or disconnected to a host electronic device 200 (FIG. 2). The detect module 162 may be a standalone application or a part of the operating system 146. Persistent data (not shown), including user data and service data used for wireless communications, can also be stored in the persistent memory 110.

A received signal such as a text message, an e-mail message, or web page download is processed by the communication subsystem 104 and input to the processor 102. The processor 102 processes the received signal for output to the display screen 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Reference is now made to FIG. 2 which illustrates in block diagram form a host electronic device 200 in accordance with one example embodiment. The host electronic device 200 is an electronic device which connects to one or more portable electronic devices 100. The host electronic device 200 may be a desktop computer, laptop computer, or workstation among many possibilities.

The host electronic device 200 includes multiple components, such as a processor 202 that controls the overall operation of the host electronic device 200. The processor 202 interacts with other components, such as RAM 208, persistent memory 210 such as flash memory, a display 212 such as an LCD, a keyboard 220, one or more control buttons 222, one or more auxiliary input/output (I/O) subsystems 224, one or more data ports 226 including at least one USB data port, a short-range wireless communication subsystem(s) 232, and a power source 242 such as a power supply which powers the host electronic device 200. The components of the host electronic device 200 are coupled via a communications bus (not shown) which provides a communication path between the various components.

The keyboard 220 is typically a "full keyboard" having a plurality of keys in which a portion of the keys have a unique alphabetic letter associated with each key. This one-to-one pairing between letters and keys will be understood to persons of ordinary skill in the art and will not be described in detail herein. The alphabetic letters are typically configured in a familiar QWERTY, QWERTZ, AZERTY, or Dvorak layout known in the art to facilitate user input. The control buttons 222 typically include a power toggle button for powering on/off the host electronic device 200. The auxiliary I/O subsystems 224 may include other input devices.

The processor 202 operates under stored program control with software stored in the memory 210 or firmware. In at least some examples, the stored programs include an operating system 246 and possibly software applications 248 that are executed by the processor 202. The applications 248 may include a detect module 262 for detecting connect and disconnect events in which a portable electronic device 100 is connected to or disconnected from the host electronic device 200 via the USB port. The detect module 262 may be a standalone application or a part of the operating system 246.

The portable electronic devices 100 can be connected to the host electronic device 200 using the USB data port, or possibly another type data port 226 and/or optionally the short-range wireless communication subsystem(s) 232 depending on the operational capabilities of the connected portable electronic devices 100 and the configuration of the host electronic device 200 and the portable electronic device 100. In some embodiments, instead of the USB port, the portable electronic device 100 could connect to the host electronic device 200 using another suitable type of data port including, but not limited to, a Firewire™ port or a proprietary data port. The one or more data ports 226 may include data ports of different types or may each be of the same type.

The short-range wireless communication subsystem(s) 232 provides a short-range wireless communication interface between the host electronic device 200 and the portable electronic device 100. The short-range wireless communication subsystem(s) 232 include one or more subsystems of the same type as the short-range wireless communication subsystem(s) 132 of the supported portable electronic devices 100. The short-range wireless communication subsystems 232 may include, but are not limited to, Bluetooth®, an IR subsystem such as IrDA, an IEEE 802.15.3a subsystem (or UWB), Z-Wave subsystem, ZigBee subsystem or other suitable short-range wireless communication interface. Connection between the host electronic device 200 and the supported portable electronic devices 100 typically involves pairing the host electronic device 200 with the portable electronic device 100 to enable short-range wireless communications between the devices.

Processes for pairing devices to enable short-range wireless communications between the devices are well known. The portable electronic device 100 receives identifying information (such as a name and Media Access Control (MAC) address) from the host electronic device 200 during the pairing process, and device parameters and configuration information are exchanged. The pairing information is stored in a profile (e.g., Bluetooth profile in the case of a Bluetooth connection) in the memory 110, 210 of the portable electronic device 100 and host electronic device 200, respectively.

Figure 3:
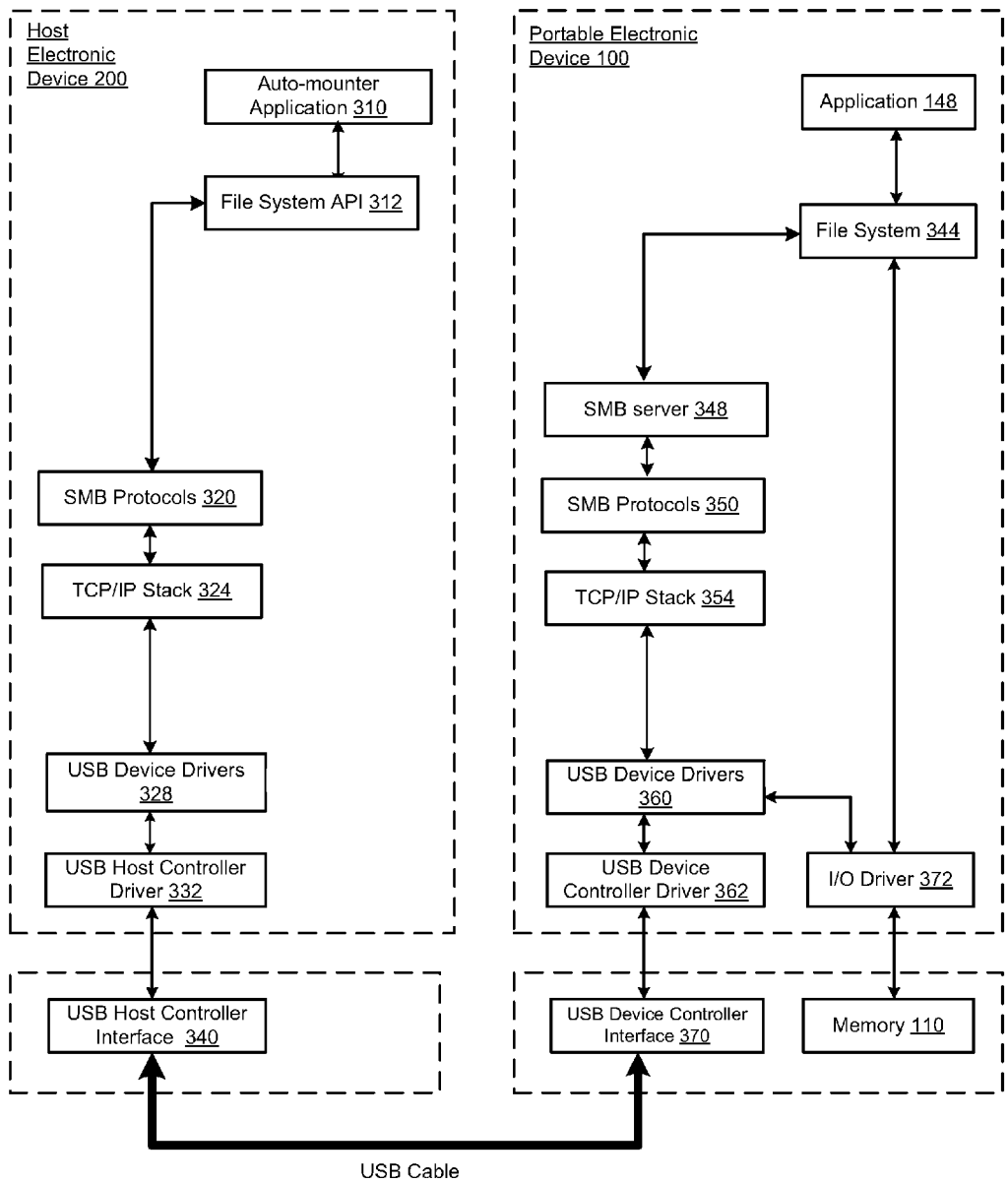
FIG. 3 is a block diagram illustrating a partial communications infrastructure in accordance with one example embodiment of the present disclosure.

FIG. 3 is a block diagram illustrating a partial communications infrastructure in accordance with one example embodiment of the present disclosure. FIG. 3 is provided for the purposes of illustration only and is not intended to be limiting. The present disclosure provides a method for sharing at least a portion of an internal storage (e.g., the memory 110) of a portable electronic device 100 on a host electronic device 200 over a USB connection in which the portable electronic device 100 communicates with the host electronic device 200 through TCP/IP-over-USB, and uses the SMB (server message block) protocol (also known as Common Internet File System (CIFS)) to make the internal storage available to the host electronic device when connected over USB rather than exposing the internal storage through a USB mass storage mode.

Typically, only a portion of the memory 110 of the portable electronic device 100 is shared, usually for security reasons. For example, the operating system 146, applications 148 and service data used for wireless communications may be located in an unshared portion of the memory 110 to protect that portion of the memory 110 from unwanted access and tampering. However, it is conceivable that the entire memory 110 is shared.

The SMB protocol provides network file sharing on a host electronic device 200 having a compatible operating system 246 such as Windows™ which enables access to the internal storage of the portable electronic device 100 on the host electronic device 200 as a network drive or network share. Functional equivalent protocols may be implemented in other operating systems which do not support the SMB protocol such as, for example, the OS X operating system for Macintosh™ or "Mac" personal computers. Equivalent functionality may be provided by including or supporting SMB client software in a personal computer. Advantageously, this solution permits access to the internal storage without requiring control of the file system of the portable electronic device 100 to be given to the operating system 246 of host electronic device 200 as in USB mass storage mode. This ensures that control of the file system of the portable electronic device 100 remains with the portable electronic device 100 at all times, which may assist in maintaining data integrity and allows access to the file system of the portable electronic device 100 simultaneously by the operating system 146 and software applications 148 of the portable electronic device 100 and the operating system 246 and software applications 248 of the host electronic device 200, among other benefits. Additionally, this solution allows sub-dividing the memory 110 and exposing different (non-overlapping) parts of the memory 110 using different credentials (e.g., username and/or password) and permissions, and allowing the memory 110 or sub-divided portions of the memory 110 supports to be accessed, for example, by the host electronic device 200.

An Auto-mounter Application 310 on the host electronic device 200 operates in the background and monitors for and detects when a portable electronic device 100 device is connected. The Auto-mounter Application 310 may be configured to start on boot-up of the host electronic device 200 and/or when a user logs in to the host electronic device 200. The Auto-mounter Application 310 enables a relatively seamless user experience for accessing the internal storage of the portable electronic device 100 when the portable electronic device 100 is connected to the host electronic device 200 over USB. This user experience is similar to a USB mass storage mode connection experience which is familiar to most device users.

The Auto-mounter Application 310 communicates with a file system API (application programing interface) 312 of the host electronic device 200. The file system API 312 communicates with USB device drivers 328 via SMB protocols 320 and the TCP/IP communications stack. The Auto-mounter Application 310 can communicate with the USB device drivers 328, even if only indirectly. The USB device drivers 328 in turn communicate with USB host controller drivers 332 which control the USB host controller interface 340, such as the USB port.

Applications 148 on the portable electronic device 100 communicate with a file system API 344 of the portable electronic device 100. The file system API 344 communicates with USB device drivers 360 via SMB server 348, SMB protocols 350 and the TCP/IP communications stack 354, and also communicates directly with the USB device drivers 360. Applications 148 on the portable electronic device 100 can communicate with the USB device drivers 360, even if only indirectly. The SMB server 348 may be implemented as a SAMBA™ server application running on the portable electronic device 100 which acts as a file server for the internal storage (e.g., the memory 110) being mounted on the host electronic device 200 as a network drive(s). The USB device drivers 360 in turn communicate with USB host controller drivers 362 which control the USB host controller interface 370, such as the USB port. The file system API 344 also communicates with an I/O driver 372 with controls the internal storage (e.g., memory 110) of the portable electronic device 100. A USB cable can be used to connect the portable electronic device 100 to the host electronic device 200 via the respective USB ports.

The communications stack on the host electronic device 200 may include a device manager (not shown). The device manager is a program or program module which manages application-level wireline access to the portable electronic device 200 when connected via USB and/or possibly Bluetooth® or other short-range wireless interface. The device manager provides a service routing API which provides applications with the ability to route traffic through the USB or Bluetooth® connection to the host electronic device 200 using standard connectivity protocols. The device manager also provides a number of device related communication services in addition to serial data bypass connection functionality including the notification of device connection and disconnection events. The Auto-mounter Application 310 may be implemented as part of the device manager rather than a standalone application.

Figure 4:
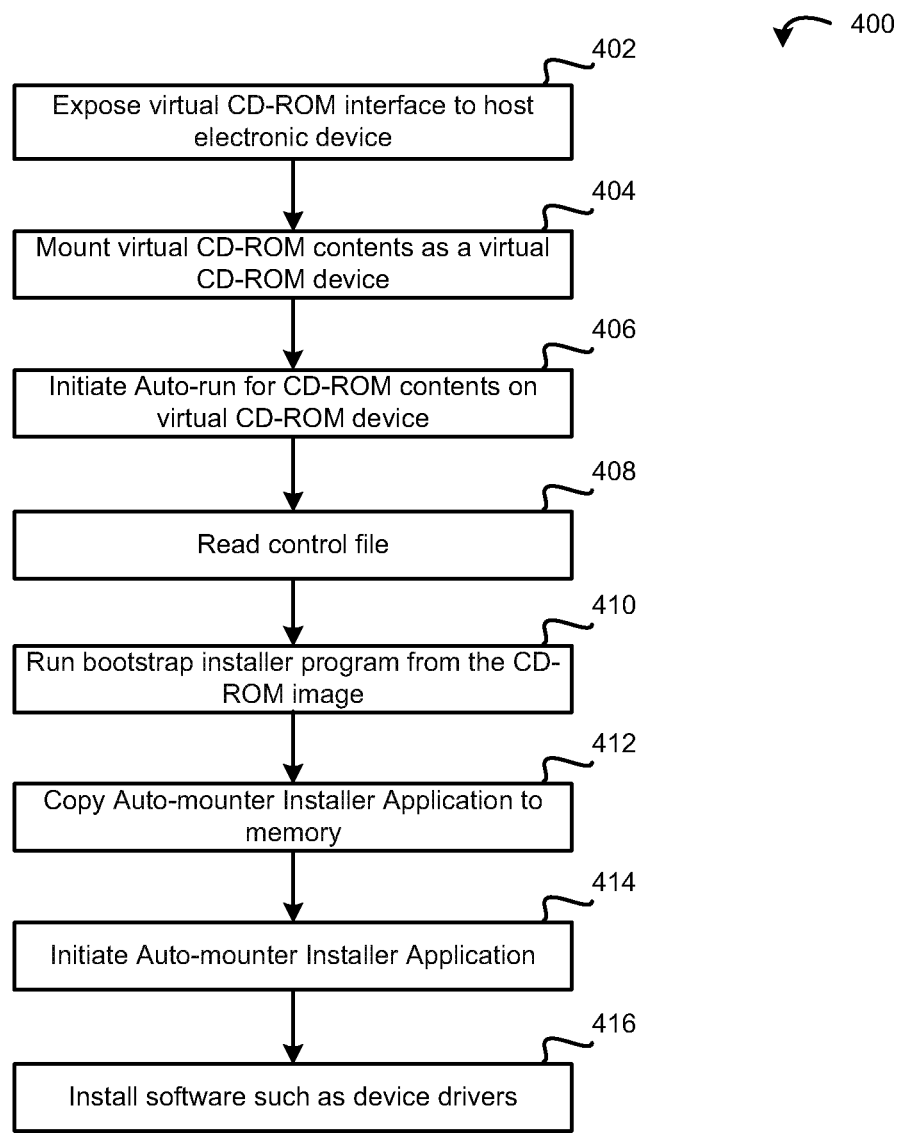
FIG. 4 is a flowchart of a method for preparing a host electronic device to access an internal storage of a portable electronic device over a USB connection in accordance with one embodiment of the present disclosure.

FIG. 4 is a flowchart of a method 400 for preparing a host electronic device 200 to access an internal storage (e.g., memory 110) of a portable electronic device 110 over a USB connection in accordance with one embodiment of the present disclosure. The method 400 may be carried out by software executed, for example, by the processor 202 of the host electronic device 200. Coding of software for carrying out the method 400 is within the scope of a person of ordinary skill in the art given the present disclosure. The method 400 may contain additional or fewer processes than shown and/or described, and may be performed in a different order. Computer-readable code executable by the processor 202 of the host electronic device 200 to perform the method 400 may be stored in a computer-readable medium such as the memory 210.

The method 400 addresses the connection of a portable electronic device 100 to a host electronic device 200 running a version of the Windows™ operating system 246 without the necessary software, such as device drivers, being installed on the host electronic device 200. When the portable electronic device 100 is connected to the host electronic device 200 using the USB port, the portable electronic device 100 exposes a virtual CD-ROM interface over the USB connection (402). The virtual CD-ROM interface provides built-in driver support on the host electronic device 200 auto-run support which makes execution of the method 400 easier for the user. Other user interfaces which provide the same or similar functionality could be exposed instead of the virtual CD-ROM interface in other embodiments.

The operating system 246 on the host electronic device 200 detects the virtual CD-ROM interface and automatically, without user intervention, mounts virtual CD-ROM contents stored in the internal memory 110 of the portable electronic device 100 as a virtual CD-ROM drive on the host electronic device 200 (404). The Windows™ operating system 246 typically has the necessary device drivers for this operation built-in/pre-installed. The portable electronic device 100 includes a "virtual CD-ROM filesystem" (or "ISO image" or "CD-ROM image") in the internal memory 110 which is mounted as the media in this virtual CD-ROM drive.

The operating system 246 on the host electronic device 200 detects the media (the "ISO image") and automatically, with user intervention, initiates CD-ROM "Auto-run" semantics in response to the Auto-run application on the ISO image (406).

The operating system 246 on the host electronic device 200 automatically reads a control file ("autorun.inf") from the ISO image (408). The control file instructs the operating system 246 to run a "Bootstrap Installer Program" from the ISO image (410).

The Bootstrap Installer Program copies an Auto-mounter Installer Application from the ISO image to the memory 210 of the host electronic device 200, typically in a temporary directory (412). The Auto-mounter Installer Application may be a standalone, executable application or part of the device communication software stack on the host electronic device 200, such as a part of the device manager above the driver layer. The Bootstrap Installer Program then launches the Auto-mounter Installer Application from the copy in the temporary directory (414).

The Auto-mounter Installer Application then operates and installs the necessary software on the host electronic device 200 (416). The installed software typically includes the Auto-mounter Application 310 and device drivers and related software (such as USB device drivers 360, driver control files and a device manager). A specific device driver for the portable electronic device 100 is not installed. Instead, USB driver support is provided which instructs the portable electronic device 100 to switch from virtual CD-ROM mode to Remote Network Driver Interface Specification (RNDIS) (on Windows™ operating systems) or Communications Device Class (on Mac™ operating systems). The USB driver support is typically provided in the form of an "INF" file (information or setup information file) which is stored in memory 210 which instructs the operating system 246 to use a built-in RNDIS driver for the portable electronic device 100 rather than a USB device driver when communicating with the portable electronic device 100.

RNDIS is a TCP/IP-over-USB protocol used by the Windows™ operating system. Functionally equivalent protocols may be implemented in other operating systems which do not support the RNDIS protocol such as Macintosh™ or "Mac" operating system. Communications Device Class (CDC), or more specifically Ethernet Control Model (ECM), is the TCP/IP-over-USB protocol used on the Macintosh™ or "Mac" operating system.

After installation is completed, the installed drivers typically terminate the virtual CD-ROM mode. A parameter on the host electronic device 200 is set to indicate to the driver layer that the necessary software is installed on the host electronic device 200. The parameter is typically stored in a hierarchical database or other database that stores configuration settings and/or options about the operating system 246. In the described embodiment, the parameter is a registry key stored in the Windows registry or similar database in OS X or other suitable operating system. The host electronic device 200 is now ready to access the internal storage (i.e., the memory 110) of the portable electronic device 200 as described below. The Auto-mounter Application 310 may be launched or initiated automatically at this time, for example, in accordance with the method 500 shown in FIG. 5 and described below.

In some embodiments, the indication that the necessary software is installed on the host electronic device 200 may be provided by a single Boolean indication on the host electronic device 200 indicating that there are portable electronic device aware drivers present. In other embodiments, the indication may be version number indicating the version of the software package (e.g., driver package) installed on the host electronic device 200 and this value is compared with the version of the drivers available on the ISO image before deciding whether the host electronic device 200 should be left in virtual CD-ROM mode (when a driver update is needed), or switched to the appropriate RNDIS/ECM mode (when no update is needed). Thus, the registry key which indicates that the portable electronic device aware driver package software is installed will now include version information that indicates what version of the portable electronic device aware driver package software which is presently installed on the host electronic device 200. This is written (or updated) when the driver package is installed (or updated). Furthermore, the version number of the driver package software carried by the ISO image on the portable electronic device 100 is made available via the virtual CD-ROM interface. This can be implemented by writing the values in a specific location on the virtual CD-ROM media.

In some embodiments, separate driver package software bundles made be stored on the virtual CD-ROM media for each supported operating system, e.g., one driver package software bundle for Windows™ and one driver package software bundle for Mac™, each with their own separate version numbers. Accordingly, all version numbers (e.g., both the Windows™ and Mac™ version numbers) are available on the virtual CD-ROM media.

Rather than merely checking whether any portable electronic device aware driver package software is installed on the host electronic device 200 as with a single Boolean indication, the local version number in the registry can be compared by identifying the current version installed with the version number on the virtual CD-ROM media. If the virtual CD-ROM media has a larger version number, the virtual CD-ROM mode is maintained (e.g., by the drivers) to allow the updated driver package to be installed.

Figure 5:
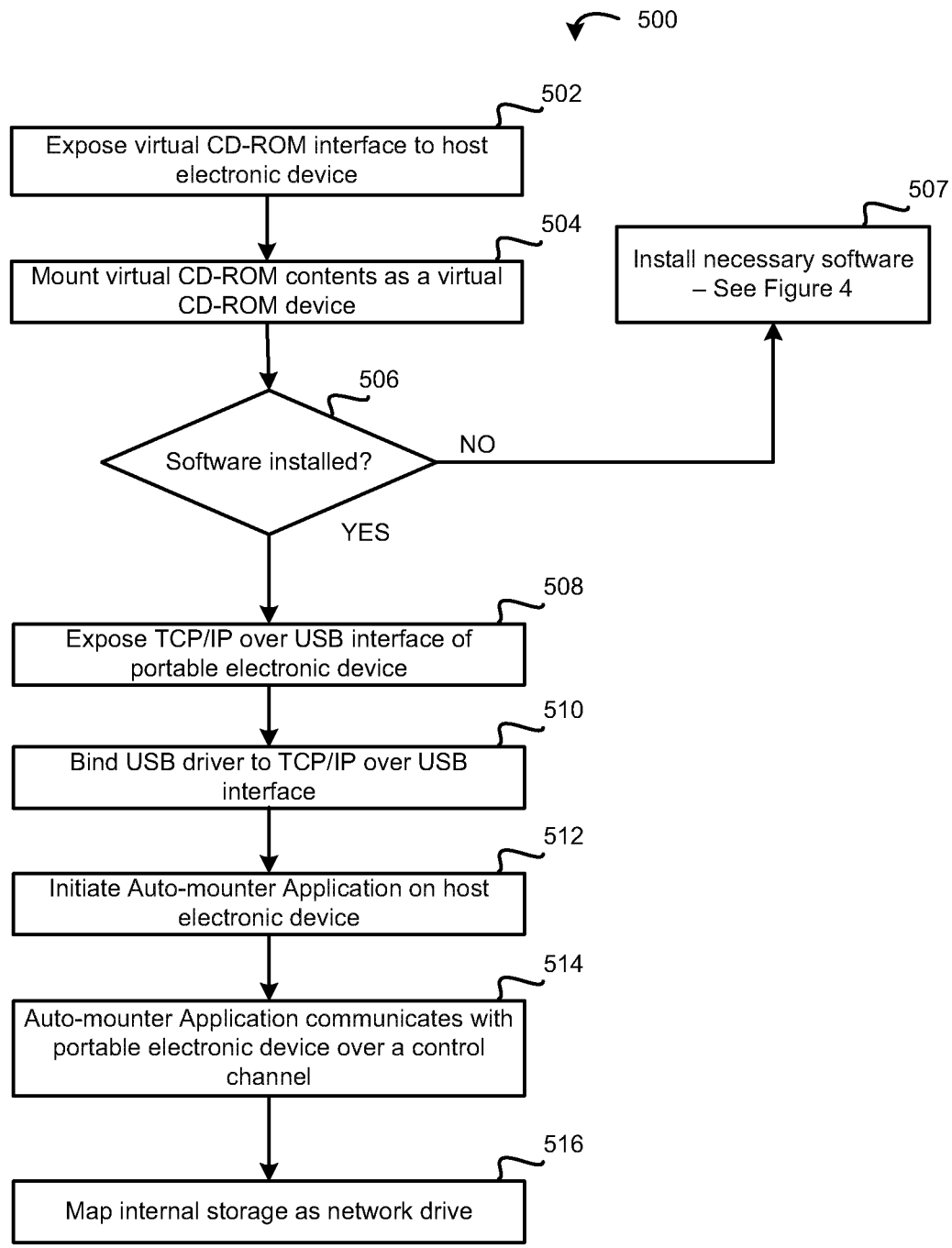
FIG. 5 is a flowchart of a method for sharing an internal storage of a portable electronic device on a host electronic device over a USB connection in accordance with one embodiment of the present disclosure.

FIG. 5 is a flowchart of a method 500 for sharing an internal storage (i.e., the memory 110) of a portable electronic device 100 on a host electronic device 200 over a USB connection in accordance with one embodiment of the present disclosure. The method 500 assumes that the necessary software has been installed on the host electronic device 200, for example, as a result of the method 400 described above and illustrated in FIG. 4. The method 500 may be carried out by software executed, for example, by the processor 202 of the host electronic device 200. Coding of software for carrying out the method 500 is within the scope of a person of ordinary skill in the art given the present disclosure. The method 500 may contain additional or fewer processes than shown and/or described, and may be performed in a different order. Computer-readable code executable by the processor 202 of the host electronic device 202 to perform the method 500 may be stored in a computer-readable medium such as the memory 210.

When the portable electronic device 100 is connected to the host electronic device 200 using the respective USB ports, the portable electronic device 100 exposes a virtual CD-ROM interface over the USB connection (502). The operating system 246 on the host electronic device 200 detects the virtual CD-ROM interface and automatically, without user intervention, mounts virtual CD-ROM contents stored in the internal storage (e.g., memory 110) of the portable electronic device 100 as a virtual CD-ROM drive on the host electronic device 200 (504).

A stored parameter (e.g., the registry key), which is typically stored and maintained by the Auto-mounter Application 310, is then analyzed (decision block 506). If the registry key indicates that the relevant software is installed, the USB device drivers 328 instruct the portable electronic device 100 to withdraw (or cancel) the virtual CD-ROM interface and expose a TCP/IP-over-USB interface (e.g., RNDIS interface for a Windows™ operating system or ECM interface for a Mac™ operating system) (508). The USB device drivers 328 also inform portable electronic device 100 which TCP/IP-over-USB interface to expose—either the RNDIS interface or ECM interface. If the registry key indicates that the relevant software is not installed, the virtual CD-ROM interface is maintained and the necessary software is installed, for example, in accordance with the method 400 described above and shown in FIG. 4 (507).

In embodiments in which the registry key indicates that version number of the installed software, if the registry key indicates is installed, the version number in the registry key is compared (typically by the USB device drivers 360) with an appropriate version number contained on the virtual CD-ROM media on the electronic device 100 (e.g., a host electronic device 200 having a Mac™ operating system comparing with the Mac™ version number, a host electronic device 200 having a Windows™ operating system comparing the Windows™ version number). If the host electronic device 200 has the same version (or a newer version) than the version indicated by the portable electronic device 100, the USB device drivers 328 instruct the portable electronic device 100 to withdraw (or cancel) the virtual CD-ROM interface and expose an appropriate TCP/IP-over-USB interface (e.g., RNDIS interface for a Windows™ operating system or ECM interface for a Mac™ operating system) (508). If the host electronic device 200 has an older version than the version indicated by the portable electronic device 100, the virtual CD-ROM interface is maintained and the necessary software is installed (e.g., software of the same or newer version indicated by the portable electronic device 100) is installed, for example, in accordance with the method 400 described above and shown in FIG. 4.

When a prior version of the software is not installed on the host electronic device 200, the registry key does not exist or alternatively the registry key exists but is empty. This is irrespective which of the described implementation of the registry key is used. Thus, analysis of the registry key allows the host electronic device 200 to determine whether the necessary software is installed (whether it is installed at all, or whether the current version is installed).

The USB device drivers 360, when already present on the host electronic device 200 (for example, due to a prior installation of the device software), can expedite the update process by launching the driver package Bootstrap Installer Application automatically rather than relying on the CD-ROM auto-run application on the host electronic device 200 to prompt the user to run the installer during a first (or "new") installation.

When the portable electronic device 100 exposes its appropriate TCP/IP-over-USB interface, the operating system 246 of the host electronic device 200 binds to this interface with the appropriate USB device driver (typically built-in) (510). Binding of the USB device driver to the TCP/IP-over-USB interface causes the portable electronic device 100 to be detected.

The Auto-mounter Application 310 is then automatically, without user intervention, invoked in response to detection of the portable electronic device 100 (512).

The Auto-mounter Application 310 communicates with the portable electronic device 100 over a control channel (514) to acquire information for mapping the internal storage (e.g., memory 110) as a network drive (or share), such as the portion of the internal storage or be shared. In some embodiments, the control channel is implemented using HTTP (Hypertext Transfer Protocol)/HTTPS (Hypertext Transfer Protocol Secure) with the portable electronic device 100 acting as an HTTP/HTTPS server and the host electronic device 200 acting as an HTTP/HTTPS client. The host electronic device 200 then connects to the portable electronic device 100 through the control channel. This could involve the device user being challenged on the host electronic device 200 to provide user authorization credentials such as a device password. If user authorization credentials are challenged, the operations only proceed when a provided password matches the device password stored in the memory 110 of the portable electronic device 100. The user may be given a limited number of attempts after which the operations are terminated and the method 500 ends.

Only if user authorization credentials are not challenged or a provided password matches the device password stored in the memory 110 of the portable electronic device 100, the Auto-Mounter Application 310 causes the host electronic device 200 to interrogate the portable electronic device 100 to determine if the portable electronic device 100 is configured to share all or a portion of its file system 344 via the SMB protocol through an SMB server application, such as SAMBA™ application, on the portable electronic device 100. The portable electronic device 100 may not be configured for USB sharing in some instances, for example, depending on device settings set by the device user or IT administrator. Even when the portable electronic device 100 is configured for USB sharing, typically only a portion of the internal storage is made available for sharing while a portion of the internal storage is not shared, such as the portions used for system files and other sensitive data. The unshared portion is typically invisible to a user of the host electronic device 200.

If the portable electronic device 100 is configured to share all or a portion of its file system 344, the host electronic device 200 then retrieves from the portable electronic device 100 the network share information (e.g., SMB username and the optional share password) for the portion of the internal storage to be shared (or exposed) by the portable electronic device 100 (i.e., the network share) via the SMB server. In the described embodiment, the SMB username is a fixed name and the portable electronic device 100 is identified by its IP address on the RNDIS/ECM connection where the SMB username has the form:

<ip_address>\fixed_name where "fixed_name" does not change but <ip_address> changes each time the portable electronic device 100 is connected to the host electronic device 200. The IP address for the RNDIS/ECM interface is a link-local address that is not accessible off of the host electronic device 200.

The share password is different from the device password mentioned above. The share password is typically generated by the portable electronic device 100 and not shared with the user, but could be shared with the user. The share password is randomly generated, typically a set frequency which may vary. The random password is communicated to the user. Instead, the share password is transmitted securely via the control channel to the Auto-mounter Application 310 which mounts the network share.

If the portable electronic device 100 is not configured to share all or a portion of its file system 344, the method 500 ends (typically before retrieving the network share information from the portable electronic device 100). Alternatively, may retrieve the network share information (e.g., SMB username and share password) from the portable electronic device 100 but does not use the information and the network share information maintained by the host electronic device 200 for the sharing the internal storage of the portable electronic device 100 would not be used, and would typically not be updated and would remain at previous values (if previously obtained and stored).

The Auto-Mounter Application 310 then issues API calls to map the internal storage (e.g., memory 110) of the portable electronic device 100 exposed by the SMB server as network drive (516). The internal storage may be mapped to a local drive letter. A visual representation of the internal storage of the mobile electronic device will be displayed with a File Manager (or File Explorer) user interface screen (such as the Windows™ Explorer user interface screen) or similar user interface screen in response to the mapping of the internal storage (e.g., memory 110) as a network work drive. The user interface screen may be displayed automatically, without user intervention, in response to the mapping of the internal storage as a network drive.

The visual representation in some embodiments is an icon display proximate to other drives on the host electronic device 200. A drive name (or label), which may partially or completely match a device name of the portable electronic device 100 such as "Playbook", may be displayed with the icon (typically beside the icon). Typically, the icon for the network drive instantiation of the internal storage is displayed with any other network drives of the host electronic device 200 within a network area of the user interface screen. In some embodiments, the user interface screen is a hierarchical menu. The device user can interact with the icon to interact with the internal storage (e.g., memory 110), for example, to view files stored on the internal storage and/or transfer files between the internal storage and the memory 210 of the host electronic device 200 in a manner similar to a USB mass storage mode.

The internal storage, mounted and mapped as a network (SMB) drive, typically has an IP address (such as an IPv4 or IPv6 address). The IP address of the connected portable electronic device 100 may be displayed in the user interface screen When the portable electronic device 100 is disconnected, for example by removing the USB cable from the host electronic device 200, the Auto-Mounter Application 310 programmatically removes the network drive (or share) mapping for the internal storage and the visual representation of the internal storage will no longer be displayed with the user interface screen.

While the example embodiments have been described as occurring between a portable electronic device 100 connected to a host electronic device 200 over a USB connection, the described methods could be applied to other IP transport bearers, such as, but not limited to, Wi-Fi (or possibly other WLAN connection type) and Bluetooth (or possibly other PAN connection type). In such alternative embodiments, the TCP/IP-over-USB connection is replaced with a TCP/IP over Wi-Fi connection or a TCP/IP over Bluetooth connection, and the USB drivers are replaced with Wi-Fi device drivers and Bluetooth device drivers, as appropriate.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. A method for sharing an internal storage of a portable electronic device, comprising:
   in response to establishment of a USB (Universal Serial Bus) communication path between the portable electronic device and a host electronic device, establishing a virtual CD-ROM interface between the portable electronic device and the host electronic device;
   using the virtual CD-ROM interface, determining whether a value of a parameter in a memory of the host electronic device is less than a value in the internal storage of the portable electronic device, or whether the parameter does not exist on the host electronic device;
   when the value of the parameter in the memory of the host electronic device is less than the value in the internal storage of the portable electronic device or when the parameter does not exist on the host electronic device:
      installing device software via the virtual CD-ROM interface and withdrawing the virtual CD-ROM interface after the installing;
   when the value of the parameter is equal to or greater than the value in the internal storage of the portable electronic device:
      withdrawing the virtual CD-ROM interfaces;
   establishing a TCP/IP (Transmission Control Protocol/Internet Protocol)-over-USB connection over the communication path, the TCP/IP-over-USB connection providing a control channel between the host electronic device and the portable electronic device;
   communicating between the host electronic device and the portable electronic device over a control channel to acquire information by the host electronic device for mapping some or all of the internal storage of the portable electronic device as a network drive;
   the acquired information including a set of permissions for accessing a first portion of the internal storage of the portable electronic device, the set of permissions being unsatisfactory for accessing a second portion of the internal storage of the portable electronic device; and
   mounting, without user intervention, the first portion of the internal storage of the portable electronic device as the network drive on the host electronic device using the acquired information, while preventing access to the second portion of the internal storage of the portable electronic device from the host electronic device.

2. The method of claim 1, wherein the mounting comprises:
   binding a device driver to the TCP/IP connection over the communication path.

3. The method of claim 1, wherein the parameter is a registry key.

4. The method of claim 1, wherein the TCP/IP-over-USB connection over the communication path is a Remote Network Driver Interface Specification (RNDIS) connection.

5. The method of claim 1, wherein the TCP/IP-over-USB connection over the communication path is an Ethernet Control Model (ECM) connection.

6. The method of claim 1, further comprising:
   exchanging data between the portable electronic device and the host electronic device using the TCP/IP-over-USB connection over the communication path.

7. The method of claim 1, wherein the control channel is implemented using HTTP (Hypertext Transfer Protocol)/HTTPS (Hypertext Transfer Protocol Secure).

8. The method of claim 1, wherein the communicating further comprises:
   requesting authorization credentials from the host electronic device;
   receiving network share information in response to validating authorization credentials received on the host electronic device.

9. The method of claim 8, further comprising:
   mapping the first portion of the internal storage of the portable electronic device as network drive in accordance with the received network share information.

10. The method of claim 1, further comprising:
    displaying the first portion of the internal storage as a network drive within a graphical user interface displayed on a display of the host electronic device.

11. The method of claim 1, further comprising:
    displaying a user interface screen on a display of the host electronic device in response to input on the host electronic device, the user interface screen including a visual representation of the first portion of the internal storage as a network drive.

12. The method of claim 11, wherein the visual representation of the first portion of the internal storage is located proximate to other connected drives on the host electronic device.

13. The method of claim 12, wherein the visual representation of the first portion of the internal storage is an icon.

14. The method of claim 1, wherein the first portion of the internal storage is mounted as an SMB (Server Message Block) network drive.

15. The method of claim 1, further comprising:
    dismounting, without user intervention, the first portion of the internal storage of the portable electronic device as a network drive on the host electronic device in response to termination of the communication path.

16. An electronic device, comprising:
    a processor;
    wherein the processor is configured to:
    in response to establishment of a USB (Universal Serial Bus) communication path between the portable electronic device and a host electronic device, establish a virtual CD-ROM interface between the portable electronic device and the host electronic device;
using the virtual CD-ROM interface, determine whether a value of a parameter in a memory of the host electronic device is less than a value in the internal storage of the portable electronic device, or whether the parameter does not exist on the host electronic device;
when the value of the parameter in the memory of the host electronic device is less than the value in the internal storage of the portable electronic device or when the parameter does not exist on the host electronic device:
   install device software via the virtual CD-ROM interface and withdrawing the virtual CD-ROM interface after the installing;
when the value of the parameter is equal to or greater than the value in the internal storage of the portable electronic device:
   withdraw the virtual CD-ROM interface;
establish a TCP/IP (Transmission Control Protocol/Internet Protocol)-over-USB connection over the communication path, the TCP/IP-over-USB connection providing a control channel between the host electronic device and the portable electronic device;
communicate between the host electronic device and the portable electronic device over a control channel to acquire information by the host electronic device for mapping some or all of the internal storage of the portable electronic device as a network drive;
the acquired information including a set of permissions for accessing a first portion of the internal storage of the portable electronic device, the set of permissions being unsatisfactory for accessing a second portion of the internal storage of the portable electronic device; and
mount, without user intervention, the first portion of the internal storage of the portable electronic device as the network drive on the host electronic device in response to establishment of a communication path between the portable electronic device and the host electronic device using the acquired information, while preventing access to the second portion of the internal storage of the portable electronic device from the host electronic device.

17. The method of claim 8, wherein receiving network share information comprises receiving, without user intervention, at least one of a name and a password.

\* \* \* \* \*